(12) United States Patent
Yamashita et al.

(10) Patent No.: US 9,752,043 B2
(45) Date of Patent: Sep. 5, 2017

(54) COATING LIQUID AND RECORDING MEDIUM

(71) Applicant: FUJI XEROX CO., LTD., Tokyo (JP)

(72) Inventors: Yoshiro Yamashita, Kanagawa (JP);
Hirohito Yoneyama, Kanagawa (JP);
Jun Kawahara, Kanagawa (JP);
Chisato Urano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/008,879

(22) Filed: Jan. 28, 2016

(65) Prior Publication Data

US 2017/0088739 A1 Mar. 30, 2017

(30) Foreign Application Priority Data

Sep. 25, 2015 (JP) ................. 2015-188942

(51) Int. Cl.
*C09D 123/12* (2006.01)
*B41M 5/52* (2006.01)
*B41M 1/30* (2006.01)

(52) U.S. Cl.
CPC ............. *C09D 123/12* (2013.01); *B41M 1/30* (2013.01); *B41M 5/5227* (2013.01); *B41M 5/5254* (2013.01)

(58) Field of Classification Search
CPC ................... B41M 5/5227; B41M 5/5254
See application file for complete search history.

(56) References Cited

U.S. PATENT DOCUMENTS

| 6,426,375 | B1 | 7/2002 | Kubota | |
|---|---|---|---|---|
| 2004/0161556 | A1* | 8/2004 | Nishijima | B41M 5/52 428/32.1 |
| 2008/0268185 | A1* | 10/2008 | Chen | B41M 5/502 428/32.24 |
| 2009/0035489 | A1* | 2/2009 | Kaimoto | B41M 5/502 428/32.1 |
| 2011/0303113 | A1 | 12/2011 | Sarkisian et al. | |
| 2013/0034656 | A1 | 2/2013 | Sarkisian et al. | |
| 2013/0044157 | A1 | 2/2013 | Sarkisian et al. | |
| 2013/0076842 | A1 | 3/2013 | Sarkisian et al. | |

FOREIGN PATENT DOCUMENTS

| JP | 2001-030616 A | 2/2001 |
|---|---|---|
| JP | 2013-538132 A | 10/2013 |

* cited by examiner

Primary Examiner — Betelhem Shewareged
(74) Attorney, Agent, or Firm — Oliff PLC

(57) ABSTRACT

A coating liquid includes a polymer particle, an aggregating agent for a coloring material, a nonionic surfactant having an HLB value within the range of 15.5 to 20, and water.

9 Claims, 1 Drawing Sheet

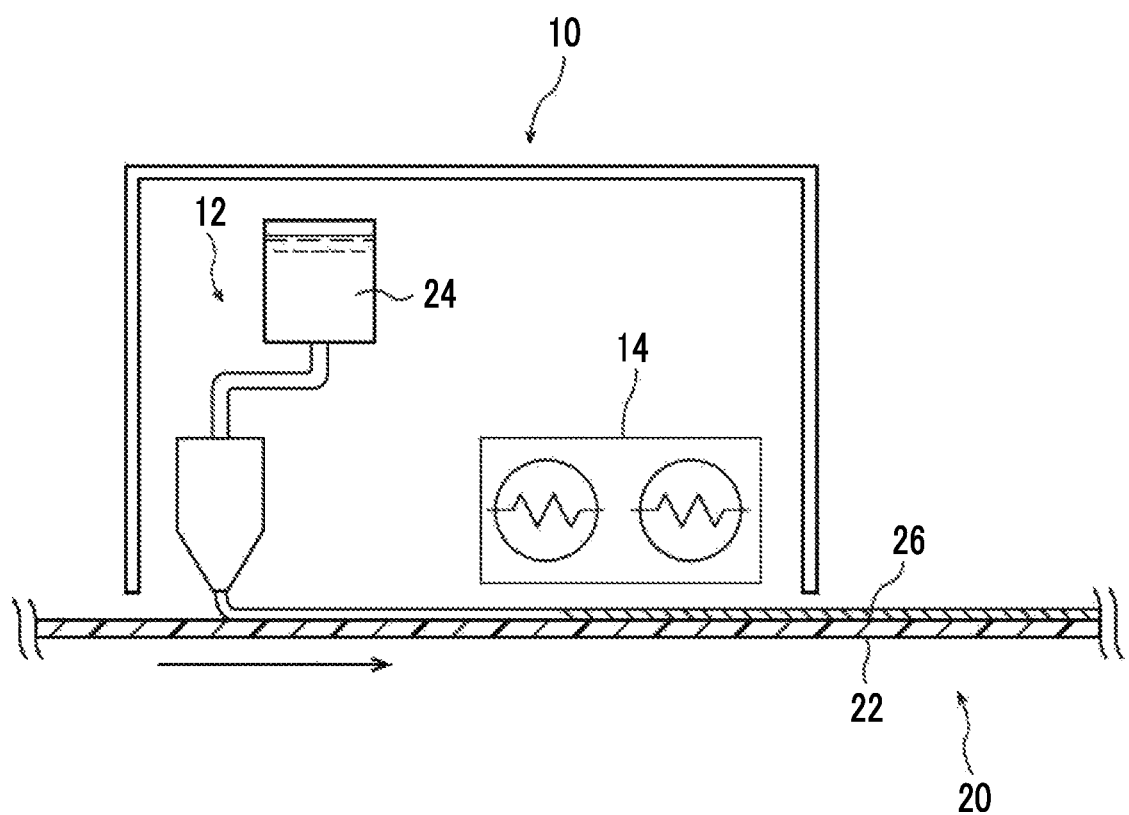

COATING LIQUID AND RECORDING MEDIUM

CROSS-REFERENCE TO RELATED APPLICATIONS

This application is based on and claims priority under 35 USC 119 from Japanese Patent Application No. 2015-188942 filed Sep. 25, 2015.

BACKGROUND

1. Technical Field

The present invention relates to a coating liquid, and a recording medium.

2. Related Art

In the package printing field, printing information may be individually modified in accordance with the development of a small-lot and a short delivery period. In this case, an ink jet method has been used as the main printing method.

Focusing on the ink used for the ink jet method, the ink is roughly divided into a solvent ink, an oil-based ink, and a water-based ink, and the water-based ink is preferably used from a viewpoint of having less influences on the environment.

SUMMARY

According to an aspect of the invention, there is provided a coating liquid including:
a polymer particle;
an aggregating agent for a coloring material;
a nonionic surfactant having an HLB value within the range of 15.5 to 20; and
water.

BRIEF DESCRIPTION OF THE DRAWING

Exemplary embodiments of the present invention will be described in detail based on the following figure, wherein:

FIG. 1 is a configuration diagram schematically illustrating an example of a recording medium preparing apparatus according to an exemplary embodiment.

DETAILED DESCRIPTION

Hereinafter, the exemplary embodiment of the present invention will be described. The description and examples are merely for exemplifying the exemplary embodiment, and the scope of the invention is not limited thereto.

Coating Liquid

The coating liquid of the exemplary embodiment contains a polymer particle, an aggregating agent for a coloring material, a nonionic surfactant having an HLB value within the range of 15.5 to 20, and water. The coating liquid of the exemplary embodiment is used as, for example, a coating liquid forming a coating layer, which is to be image-recorded by a water-based ink, on a non-permeable base material.

The hydrophile-lipophile balance value (HLB value) is an index indicating the degree of hydrophilicity and lipophilicity of the surfactant. As the HLB value is small, the lipophilicity is high, and as the HLB value is large, the hydrophilicity is high. In the exemplary embodiment, the HLB value is a value obtained by the following Equation, and the value is in a range of 0 to 20.

HLB value=20×sum of formula weight of hydrophilic portion/molecular weight

The coating liquid of the exemplary embodiment is applied to a surface of the non-permeable base material, and forms the coating layer, which is to be image-recorded by the water-based ink, on the non-permeable base material. A method of recording an image onto the coating layer formed on the non-permeable base material with the water-based ink is not particularly limited; however, an ink jet method is preferably used.

The coating layer which is formed by using the coating liquid of the exemplary embodiment includes the aggregating agent for a coloring material derived from the coating liquid, and thus it is possible to prevent the bleeding between colors in the water-based ink. The coating layer which is formed by using the coating liquid of the exemplary embodiment contains a polymer derived from the polymer particle which is contained in the coating liquid, and thus has excellent adhesiveness with respect to the non-permeable base material (particularly, a base material formed of resin), and has excellent fixing properties of an image recorded with the water-based ink (particularly, the water-based ink containing the polymer).

Therefore, according to the coating liquid of the exemplary embodiment, when the image is recorded on the non-permeable base material with the water-based ink, it is possible to record an image in which the bleeding between colors is prevented and the fixing properties are excellent.

In addition, the coating liquid of the exemplary embodiment contains a nonionic surfactant having an HLB value within the range of 15.5 to 20, and thus has excellent storage stability.

In aqueous coating liquids containing both the polymer particle and the aggregating agent for a coloring material, the polymer particles are aggregated and then gelled in a preparing step, or the polymer particles are thickened and gelled during the storage. It is presumed that such a phenomenon is caused by that the aggregating agent for a coloring material destabilizes the dispersion of polymer particles.

In contrast, when the nonionic surfactant having an HLB value within the range of 15.5 to 20 is contained in the aqueous coating liquid containing both the polymer particle and the aggregating agent for a coloring material, the coating liquid is stably prepared and the storage stability of the coating liquid is improved. As the reason therefor, it is presumed that the nonionic surfactant having an HLB value within the range of 15.5 to 20 prevents the interaction between the polymer particle and the aggregating agent for a coloring material, and prevents the aggregation of the polymer particles. In a nonionic surfactant having an HLB value which is less than 15.5, the effect of preventing the interaction between the polymer particle and the aggregating agent for a coloring material is weak, and thus it is not possible to sufficiently prevent the aggregation of the polymer particles. Meanwhile, the HLB value of the nonionic surfactant is theoretically equal to or less than 20.

The cloudiness of the coating layer which is formed by using the coating liquid of the exemplary embodiment is prevented. This is considered because the polymer particles are stably dispersed in the coating liquid of the exemplary embodiment, and thus an aggregate which is formed of the polymer particles is hardly brought into the coating layer from the coating liquid. In addition, even when a solvent of the coating liquid which is applied onto the non-permeable base material is evaporated, it is considered that the aggregation of the polymer particles is prevented by the action of the nonionic surfactant having an HLB value within the range of 15.5 to 20, and thus the cloudiness of the coating layer is prevented.

Hereinafter, components of the coating liquid of the exemplary embodiment will be specifically described.

The coating liquid of the exemplary embodiment contains at least a polymer particle, an aggregating agent for a coloring material, a nonionic surfactant having an HLB value within the range of 15.5 to 20, and water, and may also contain other additives. The coating liquid of the exemplary embodiment does not substantially contain a coloring material.

Polymer Particle

The coating liquid of the exemplary embodiment contains the polymer particle, and thus has excellent adhesiveness of the coating layer with respect to the non-permeable base material (particularly, a base material formed of resin). In addition, the coating liquid of the exemplary embodiment contains the polymer particle, and thus has the excellent fixing properties of an image to the coating layer.

Meanwhile, from a view point of the adhesiveness of the coating layer with respect to the non-permeable base material and the fixing properties of the image to the coating layer, the polymer contained in the coating liquid may be water-soluble; however, when the polymer is water-soluble, the viscosity of the coating liquid extremely increased, and thereby the water resistance of the coating layer may be insufficient. Therefore, the polymer contained in the coating liquid is preferably particles which are dispersed in water. Accordingly, the coating liquid of the exemplary embodiment contains the polymer particle. However, the coating liquid of the exemplary embodiment does not exclude a water-soluble polymer (for example, an emulsifier).

The polymers forming the polymer particle are preferable to have high affinity with respect to the non-permeable base material, and may be selected in accordance with the material of the non-permeable base material. Examples of the polymer particle include a polypropylene particle, a polyethylene terephthalate particle, and a nylon particle.

The polymer particle may be dispersed in the coating liquid by using an emulsifier, and may be self-dispersed in the coating liquid by a hydrophilic group contained in the polymer particle. Examples of the emulsifier include a polymer (for example, a copolymer of a polymer in which a hydrophilic group is grafted, a monomer containing a hydrophilic group, and a monomer containing a hydrophobic portion) containing a hydrophilic group such as a sulfonic acid group and a carboxyl group, and a surfactant.

It is preferable that the polymer particle may be blended with the coating liquid by using aqueous dispersion (emulsion) obtained in such a manner that the polymer particles are dispersed in water in advance.

In order to improve the fixing property of the image to the coating layer, the weight-average molecular weight Mw of the polymer forming the polymer particle is preferably in a range of 1,000 to 100,000,000, and is more preferably in a range of 2,000 to 50,000,000.

The weight-average molecular weight Mw of the polymer is measured by using a gel permeation chromatography (GPC). In the measurement of the molecular weight by using the GPC, HLC-8120 GPC and SC-8020 (manufactured by Tosoh Corporation) are used as a measuring device, two TSKgel SuperHM-Ms (6.0 mm ID×15 cm) (manufactured by Tosoh Corporation) are used as columns, and tetrahydrofuran is used as an eluent. The detection is performed in a RI detector under the measuring conditions such as sample concentration of 0.5% by weight, a flow rate of 0.6 mL/min, a sample injection amount of 10 μL, and a measuring temperature of 40° C. A calibration curve is made from "polystyrene standard sample TSK standard" (manufactured by Tosoh Corporation): 10 samples such as "A-500", "F-1", "F-10", "F-80", "F-380", "A-2500", "F-4", "F-40", "F-128", and "F-700".

In order to improve the fixing property of the image to the coating layer, the volume average particle diameter D50v of the polymer particle is preferably in a range of 50 nm to 400 nm, and is more preferably in a range of 70 nm to 300 nm.

In the exemplary embodiment, the measurement of the volume average particle diameter D50v of the particle contained in the liquid composition (for example, the coating liquid and the water-based ink) is performed by using a dynamic light scattering particle size analyzer (UPA-UT151, Microtrac). The measurement is performed by putting the liquid composition which is diluted 1,000 times in a measuring cell.

The polymer particle may be used alone or in combination of two or more kinds thereof.

In order to improve the fixing property of the image to the coating layer, the content of the polymer particle is preferably in a range of 2% by weight to 30% by weight, and is more preferably in a range of 3% by weight to 20% by weight, with respect to the weight of the coating liquid.

Aggregating Agent for a Coloring Material

The aggregating agent for a coloring material is a substance having an effect of causing the aggregation of the coloring material by reacting or interacting with the coloring material in the water-based ink. Examples of the aggregating agent for a coloring material include an inorganic acid, inorganic acid salts, an organic acid, and an organic acid salt.

Since the non-permeable base material almost does not absorb the water-based ink, it takes time to dry the water-based ink. At this time, liquid droplets of the water-based ink contacts with each other before the water-based ink is dried, and thus the bleeding between colors is likely to occur. In contrast, the coating liquid of the exemplary embodiment contains the aggregating agent for a coloring material, and thus the bleeding between colors of the water-based ink in the coating layer is prevented.

From a view point of the storage stability of the coating liquid, as the aggregating agent for a coloring material, at least one selected from a group consisting of an inorganic acid and an inorganic acid salt is preferably used, and in order to prevent the bleeding between colors in the coating layer, at least one selected from a metal salt of an inorganic acid is preferably used, and at least one selected from a multivalent metal salt of an inorganic acid is more preferably used. Examples of the metal constituting metal salt of an inorganic acid include zinc, calcium, barium, magnesium, aluminum, iron, lithium, and potassium.

Examples of an inorganic acid and an inorganic acid salt include phosphoric acid, thiocyanic acid, hydrochloric acid, a nitric acid, a sulfuric acid, a perchloric acid, a carbonic acid, or metal salts thereof. Among them, in order to improve the storage stability of the coating liquid and prevent the bleeding between colors in the coating layer, calcium nitrate, magnesium nitrate, aluminum nitrate, and calcium chloride are preferably used.

Examples of an organic acid and an organic acid salt include citric acid, succinic acid, tartaric acid, oxalic acid, fumaric acid, phthalic acid, maleic acid, malonic acid, malic acid, pyrrolidone carboxylic acid, pyrone carboxylic acid, pyrrole carboxylic acid, furan carboxylic acid, coumaric acid, thiophene carboxylic acid, and nicotinic acid; derivatives of these acids; and metal salts of these acids.

The aggregating agent for a coloring material may be used alone or in combination of two or more kinds thereof.

In order to prevent the bleeding between colors in the coating layer, a content of the aggregating agent for a coloring material is preferably equal to or greater than 0.1% by weight, is more preferably equal to or greater than 0.3% by weight, and is still more preferably equal to or greater than 1% by weight, with respect to the weight of the coating liquid, and from a view point of the storage stability of the coating liquid, the content of the aggregating agent for a coloring material is preferably equal to or less than 10% by weight, is more preferably equal to or less than 8% by weight, and is still more preferably equal to or less than 5% by weight, with respect to the weight of the coating liquid.

Nonionic Surfactant Having HLB Value which is in Range of 15.5 to 20 (First Nonionic Surfactant)

The coating liquid of the exemplary embodiment contains the nonionic surfactant having an HLB value within the range of 15.5 to 20 (also referred to as a "first nonionic surfactant").

From a view point of the excellent storage stability of the coating liquid, as the first nonionic surfactant, a nonionic surfactant having an HLB value within the range of 15.5 to 19.5 is more preferable, a nonionic surfactant having an HLB value within the range of 15.5 to 19.0 is still more preferable, a nonionic surfactant having an HLB value within the range of 16.0 to 19.0 is still more preferable, a nonionic surfactant having an HLB value within the range of 16.5 to 19.0 is still more preferable, and a nonionic surfactant having an HLB value within the range of 17.0 to 19.0 is still more preferable.

Examples of compounds of the first nonionic surfactant include polyoxyalkylene alkyl ethers, polyoxyalkylene alkylphenyl ethers, polyoxyalkylene styrenated phenyl ethers, polyoxyalkylene distyrenated-phenyl ethers, polyethylene glycol alkyl esters, polyoxyalkylene fatty acid esters, sorbitan fatty acid esters, and polyoxyalkylene sorbitan fatty acid esters. Among them, polyoxyalkylene alkyl ethers (among them, polyoxyethylene alkyl ether), polyoxyalkylene alkylphenyl ethers (among them, polyoxyethylene alkyl phenyl ether), polyoxyalkylene styrenated phenyl ethers (among them, polyoxyethylene styrene phenyl ether), and polyoxyalkylene distyrenated-phenyl ethers (among them, polyoxyethylene distyrenated phenyl ether) are preferably used.

The first nonionic surfactant may be used alone or in combination of two or more kinds thereof.

It is presumed that the first nonionic surfactant prevents the aggregating agent for a coloring material from destabilizing the dispersion of polymer particles, and thus, the storage stability of the coating liquid may be improved. Therefore, it is preferable that the content of the first nonionic surfactant is adjusted in accordance with the content of the aggregating agent for a coloring material.

However, from a view point of the fixing properties of the image to the coating layer, the content of the first nonionic surfactant is preferable to be small.

A content of first nonionic surfactant is preferably in a range of 10% by weight to 200% by weight, is more preferably in a range of 20% by weight to 200% by weight, is still more preferably in a range of 25% by weight to 150% by weight, and is still more preferably in a range of 30% by weight to 100% by weight, with respect to the weight of the aggregating agent for a coloring material.

The content of the first nonionic surfactant is preferably in a range of 0.1% by weight to 5% by weight, is more preferably in a range of 0.2% by weight to 5% by weight, and is still more preferably in a range of 0.5% by weight to 3% by weight, with respect to the weight of the coating liquid.

The coating liquid of the exemplary embodiment may contain a nonionic surfactant having an HLB value which is less than 15.5 in addition to the nonionic surfactant having an HLB value within the range of 15.5 to 20. In the coating liquid of the exemplary embodiment, at least one of plural kinds of nonionic surfactants may be the nonionic surfactant having an HLB value within the range of 15.5 to 20.

Nonionic Surfactant Having HLB Value which is Less than 15.5 (Second Nonionic Surfactant)

In order to improve the wettability of the non-permeable base material, it is preferable that the coating liquid of the exemplary embodiment contains the nonionic surfactant having an HLB value which is less than 15.5 (also referred to as a "second nonionic surfactant"). The coating liquid contains the second nonionic surfactant, and thus in a case of coating the entire surface with respect to the non-permeable base material, it is possible to form a coating layer having excellent smoothness and uniformity, and in a case of partially coating the non-permeable base material, it is possible to prevent positional deviation of the coating layer due to the cissing or the interference between liquids.

In order to improve the wettability of the coating liquid with respect to the non-permeable base material, as second nonionic surfactant, a nonionic surfactant having an HLB value which is equal to or less than 10 is preferably used, and a nonionic surfactant having an HLB value which is less than 9 is more preferably used.

Examples of compounds of the second nonionic surfactant include polyoxyethylene acetylenic•glycol ethers, ethylene oxide adducts of tetramethyl decynediol, polyoxyethylene alkyl ethers, polyoxyethylene alkyl phenyl ethers, polyoxyethylene styrenated-phenyl ethers, and polyoxyethylene distyrenated-phenyl ethers. Examples of commercially available products of the second nonionic surfactant include OLFINE E1004, E1006, and E1010 (which are manufactured by Nissin Chemical Industry Co., Ltd.), SURFYNOL 104, 420, 440, and 465 (which are manufactured by Nissin Chemical Industry Co., Ltd.), and NEWCOL 2302, 2303, and 2305 (which are manufactured by Japan Emulsifier).

The second nonionic surfactant may be used alone or in combination of two or more kinds thereof.

The content of second nonionic surfactant is preferably in a range of 0.05% by weight to 5% by weight, is more preferably in a range of 0.05% by weight to 3% by weight, and is still more preferably in a range of 0.1% by weight to 2% by weight, with respect to the weight of the coating liquid.

A surfactant having a relatively low HLB value has low water solubility, and is not easily added into water by alone. The first nonionic surfactant has a function of stably dissolving or dispersing a large amount of the second nonionic surfactant in the water, and thus contributes to the stable formation of the coating layer.

In a case where the coating liquid of the exemplary embodiment contains the first nonionic surfactant and the second nonionic surfactant, the HLB value (weighted average of the HLB value of each component) of the entire nonionic surfactants may be less than 15.5. Here, the HLB value (weighted average of the HLB value of each component) of the entire nonionic surfactants is preferably equal to or greater than 14.0, is more preferably equal to or greater than 14.5, is still more preferably equal to or greater than 15.0, and is still more preferably equal to or greater than 15.5, as a lower limit value and is theoretically equal to or less than 20, is preferably equal to or less than 19.5, and is more preferably equal to or less than 19.0, as an upper limit value.

Water

The coating liquid of the exemplary embodiment includes water. In the coating liquid of the exemplary embodiment, it is preferable that water is a main solvent. The coating liquid of the exemplary embodiment contains water as a main solvent, and thus the impact on the environment may be prevented.

In the exemplary embodiment, "the main solvent" represents a solvent having the largest weight among all of the solvents.

From a viewpoint of preventing the contamination of impurities or microbial occurrence, distilled water, ion exchange water, and ultrafiltered water are preferably used as water.

A content of water is preferably equal to or greater than 30% by weight, is more preferably equal to or greater than 40% by weight, and is still more preferably equal to or greater than 50% by weight, and also the content of water is preferably equal to or less than 90% by weight, is more preferably equal to or less than 88% by weight, and is still more preferably equal to or less than 85% by weight, with respect to the weight of the coating liquid.

Other Additives

The coating liquid of the exemplary embodiment may contain other additives, if necessary. Examples of other additives include known additives such as a water-soluble organic solvent, a penetrant, a viscosity modifier, a pH adjusting agent, a pH buffering agent, an antioxidant, an ultraviolet absorber, an infrared absorber, a preservative, an antifungal agent, an anionic surfactant, a cationic surfactant, and an amphoteric surfactant.

Examples of the water-soluble organic solvent include alcohol (ethanol, isopropyl alcohol, butyl alcohol, and benzyl alcohol), polyol (ethylene glycol, diethylene glycol, propylene glycol, triethylene glycol, 1,5-pentanediol, and 1,2-hexanediol), a polyol derivative, a nitrogen-containing solvent (pyrrolidone, N-methyl-2-pyrrolidone, cyclohexyl pyrrolidone, and triethanolamine), and a sulfur-containing solvent (thiodiethanol, thiodiglycerol, sulfolane, and dimethyl sulfoxide). The water-soluble organic solvent may be used alone or in combination of two or more kinds thereof.

In a case where the coating liquid of the exemplary embodiment contains the water-soluble organic solvent, the content of the water-soluble organic solvent is preferably in a range of 0.01% by weight to 5% by weight, and is more preferably in a range of 0.05% by weight to 1% by weight, with respect to water.

Physical Properties of Coating Liquid pH of the coating liquid in the exemplary embodiment is preferably in a range of 1.5 to 12.0, is more preferably in a range of 4.0 to 11.0, and is still more preferably in a range of 6.0 to 10.0.

The viscosity of the coating liquid in the exemplary embodiment is preferably in a range of 1.2 mPa·s to 30 mPa·s, is more preferably equal to or greater than 1.4 mPa·s and is less than 20 mPa·s, and is still more preferably equal to or greater than 1.6 mPa·s and is less than 15 mPa·s.

In the exemplary embodiment, the viscosity of the liquid composition (for example, the coating liquid and the water-based ink) is measured by using TV-20 type viscometer (Toki Sangyo Co., Ltd.) as a measuring device under the conditions of measuring temperature of 23° C. and shear velocity of 750 s$^{-1}$.

The surface tension of the coating liquid in the exemplary embodiment is preferably in a range of 10 mN/m to 45 mN/m, is more preferably in a range of 15 mN/m to 40 mN/m, and is still more preferably in a range of 20 mN/m to 35 mN/m.

In the exemplary embodiment, the surface tension of the liquid composition (for example, the coating liquid and the water-based ink) is measured by using wilhelmy type surface tension meter under the condition of a measuring temperature of 23° C. and 55% RH.

Coating Liquid Cartridge

The coating liquid cartridge of the exemplary embodiment is a cartridge which accommodates the coating liquid of the exemplary embodiment. The coating liquid cartridge of the exemplary embodiment may be used for an ink jet recording apparatus in addition to a recording medium preparing apparatus described below.

Recording Medium

The recording medium of the exemplary embodiment includes a non-permeable base material and a coating layer which is formed on the non-permeable base material by using the coating liquid of the exemplary embodiment.

Accordingly, the recording medium of the exemplary embodiment includes a non-permeable base material and a coating layer which is disposed on the non-permeable base material, and the coating layer includes a polymer, an aggregating agent for a coloring material, and a nonionic surfactant having an HLB value within the range of 15.5 to 20.

The recording medium of the exemplary embodiment is used as, for example, a packaging material which is used in the packaging or packing of products; a flexible packaging material; a synthetic packaging material; and the like, and on which, for example, product information and production information is image-recorded with the water-based ink formed on the coating layer. The method of recording an image by using the water-based ink on the coating layer is not particularly limited; however, an ink jet method is preferably used.

Non-Permeable Base Material

The non-permeable base material is a base material to which water droplets do not substantially penetrate, here "do not substantially penetrate" means that a penetration rate of water drops is less than 5% by weight after 1 minute.

Examples of the non-permeable base material include a film and a plate which are formed of a material such as a resin, metal, glass, ceramic, silicon, and rubber; and a sheet which is coated with a resin.

As the non-permeable base material, various kinds of resin films which are used for a packaging material in the related art are preferably used. Examples of the material for the resin films include polypropylene, polyethylene terephthalate, and nylon. In order to enhance the adhesion of the coating layer, it is preferable to use a resin film of which the surface is subjected to a charging treatment such as corona discharge treatment.

Coating Layer

The coating layer is a layer for fixing the water-based ink as an image. Therefore, in a surface of the non-permeable base material on which the image recording is performed, the coating layer may be at least a portion which is image-recorded. However, in order to widen the degree of freedom of use of the recording medium, it is preferable that the coating layer covers the entire surface of the non-permeable base material on which the image recording is performed.

The coating layer is a layer formed by drying the coating liquid of the exemplary embodiment, and includes at least a polymer, an aggregating agent for a coloring material, and a nonionic surfactant having an HLB value within the range of 15.5 to 20, and the coating layer may include other additives contained in the coating liquid.

The coating liquid of the exemplary embodiment includes the polymer particle, and thus the polymer contained in the coating layer is not limited to the shape of particle. The polymer in the coating layer may be contained as a particle, or a portion or the entire polymer may be integrally contained.

Specific aspects for the respective components contained in the coating layer, that is, the polymer (which is derived from the polymer particle contained in the coating liquid), the aggregating agent for a coloring material, the nonionic surfactant having an HLB value within the range of 15.5 to 20, and other additives are as described for the coating liquid.

The thickness of the coating layer is not limited; however, it is preferably in a range of 0.1 μm to 15 μm, is more preferably in a range of 0.2 μm to 10 μm, and is still more preferably in a range of 0.3 μm to 5 μm.

The coating layer may be a layer which is subjected to a smoothing process such as a calendering process.

The recording medium of the exemplary embodiment is prepared by using, for example, a recording medium preparing apparatus and a method of preparing a recording medium described below.

Recording Medium Preparing Apparatus and Method of Preparing Recording Medium

The recording medium preparing apparatus of the exemplary embodiment is a recording medium preparing apparatus which prepares a recording medium having a coating layer, which is to be image-recorded by a water-based ink, on a non-permeable base material, and is provided with a coating liquid applying unit that accommodates the coating liquid of the exemplary embodiment, and applies the coating liquid onto the non-permeable base material. It is preferable that the recording medium preparing apparatus of the exemplary embodiment is further provided with a dry unit that dries the coating liquid applied onto the non-permeable base material. The recording medium preparing apparatus of the exemplary embodiment may further include a unit that performs a smoothing process such as a calendering process on the coating layer.

In the recording medium preparing apparatus of the exemplary embodiment, for example, a portion which accommodates the coating liquid may be a cartridge structure which is detachable from the recording medium preparing apparatus. As the cartridge, a coating liquid cartridge of the exemplary embodiment is preferably used.

According to the recording medium preparing apparatus of the exemplary embodiment, the method of preparing a recording medium of the exemplary embodiment is performed. The method of preparing a recording medium of the exemplary embodiment is a method of preparing a recording medium of preparing a recording medium having the coating layer, which is to be image-recorded by the water-based ink, on the non-permeable base material, and includes a coating liquid applying unit that applies the coating liquid of the exemplary embodiment onto the non-permeable base material. It is preferable that the method of preparing a recording medium of the exemplary embodiment further includes a drying process of drying the coating liquid applied onto the non-permeable base material. The method of preparing a recording medium of the exemplary embodiment may further include a process of performing a smoothing process such as calendering process on the coating layer.

Examples of the coating liquid applying unit include a coating liquid applying unit such as a coating type unit, an ink jet type unit, and an immersion type unit. Examples of the coating type unit include a roll coater, a bar coater, a blade coater, an air knife coater, and a squeeze coater. The ink jet type unit will be specifically described as follows.

Applying the coating liquid onto the non-permeable base material may be performed on at least a portion which is image recorded in the surface on which the image recording is performed. In order to widen the degree of freedom of use of the recording medium and improve preparing efficiency of the recording medium, it is preferable that applying the coating liquid onto the non-permeable base material is performed on the entire surface of the non-permeable base material on which the image recording is performed.

As applying amount of the coating liquid is not particularly limited; however, in the coating layer, a content of the aggregating agent for a coloring material is preferably in a range of 0.001 g/m$^2$ to 1.5 g/m$^2$, and is more preferably in a range of 0.005 g/m$^2$ to 1.0 g/m$^2$.

Examples of the drying unit include a known heating unit such as an infrared heater, a blowing unit utilizing blowing air such as a dryer, or a unit obtained by combining these.

In order to enhance the smoothness of the coating layer, or enhance the adhesiveness of the coating layer with respect to the non-permeable base material, as a heating temperature by the drying unit, a temperature of the polymer forming the polymer particle contained in the coating liquid is preferably equal to or greater than a glass transition temperature. When the polymer is heated up to equal to or greater than the glass transition temperature, at least a portion of the polymer derived from the coating liquid is integrally melted and solidified, and thus the smoothness of the coating layer is enhanced and the adhesiveness of the coating layer is enhanced with respect to the non-permeable base material. The specific heating temperature differs depending on the kind of the polymer; however, the specific heating temperature is preferably in a range of 25° C. to 90° C., and is more preferably in a range of 35° C. to 80° C., as a surface temperature of the non-permeable base material.

Hereinafter, the recording medium preparing apparatus of the exemplary embodiment and the action thereof will be described with reference to the drawings.

FIG. 1 is a configuration diagram schematically illustrating an example of the recording medium preparing apparatus of the exemplary embodiment. A recording medium preparing apparatus 10 illustrated in the FIG. 1 is provided with a coating liquid applying unit 12 and a drying unit 14. The coating liquid applying unit 12 accommodates a coating liquid 24 therein. The drying unit 14 is provided with, for example, a heat source therein.

The coating liquid applying unit 12 applies the coating liquid 24 to a non-permeable base material 22 which is transported in an arrow direction. The drying unit 14 dries the coating liquid 24 which is applied onto the non-permeable base material 22. The coating liquid 24 is dried on the non-permeable base material 22, the coating layer 26 is formed, and thereby the recording medium 20 is prepared.

Water-Based Ink

In the recording medium of the exemplary embodiment, the coating layer is image-recorded by using the water-based ink. The method of recording an image by using the water-based ink with respect to the recording medium of the exemplary embodiment is not particularly limited; however, an ink jet method is preferably used.

Hereinafter, the water-based ink for recording an image on the recording medium of the exemplary embodiment will be described.

The water-based ink contains at least a coloring material and water, and may contain other additives. The water-based ink may be the water-based ink which is used to perform the image recording on the sheet. In order to improve the fixing properties of the coating layer in the recording medium of the exemplary embodiment, it is preferable that the water-based ink contains the polymer.

Coloring Material

Examples of the coloring material include a pigment and a dye, and the pigment is preferably used. Examples of the pigment include various known organic pigments and inorganic pigments. Depending on the hue of the water-based ink, the coloring material is used by selecting from a black pigment or a black dye, a cyan pigment or a cyan dye, a magenta pigment or a magenta dye, and a yellow pigment or a yellow dye, or used in combination thereof.

When the pigment is used as a coloring material, it is preferable that a pigment dispersant is used in combination. Examples of the pigment dispersant include various known polymeric dispersant, and surfactant.

The pigment dispersant may be used alone or in combination of two or more kinds thereof. The content of pigment dispersant differs depending on the kinds of the pigment and pigment dispersant; however the content of pigment is preferably in a range of 0.1% by weight to 100% by weight.

Examples of the pigment include a pigment which is self-dispersed (hereinafter, referred to as a "self-dispersed pigment") in water. The self-dispersed pigment represents a pigment which contains a hydrophilic group on the surface of the pigment, and is dispersed in the water without a pigment dispersant. Examples of the self-dispersed pigment include various known self-dispersed pigments which are obtained by performing surface modification treatment such as coupling agent treatment, polymer grafting treatment, plasma treatment, oxidation treatment, and reducing treatment with respect to the pigment.

Examples of the pigment include a so-called microcapsule pigment coated with a resin. Commercially available microcapsule pigments are manufactured by DIC Co., Ltd. and Toyo Ink Co., Ltd.

Examples of the pigment include a resin dispersion type pigment which is obtained by physically adsorbing or chemically coupling a polymer compound to a pigment.

Examples of the pigment include a specific color pigment such as red, green, brown, and white; a metallic luster pigment such as gold and silver; a colorless or light-colored extender pigment; plastic pigments; a particle which fixes a dye or a pigment on a surface of silica, alumina, or polymer bead; an insoluble lake product of a dye; colored emulsion; and colored latex.

The volume average particle diameter D50v of the coloring material is, for example, in a range of 10 nm to 1,000 nm. The volume average particle diameter D50v of the coloring material is referred to as a particle diameter of the coloring material, or a particle diameter with an additive attached in a case where the additive such as a dispersant is attached to the coloring material.

The coloring material may be used alone or in combination of two or more kinds thereof.

A content of the coloring material is preferably in a range of 1% by weight to 25% by weight, and is more preferably in a range of 2% by weight to 20% by weight, with respect to the weight of the water-based ink.

Polymer

From a viewpoint of affinity with the water-based ink and coating layer, as the polymer, a polymer containing a coating layer, a polymer of which at least a part of the monomer component is the same, or a polymer containing a common functional group is preferable.

The polymer contained in the water-based ink may be a water-soluble polymer, and a polymer particle which is dispersed in the water.

From a view point of the fixing properties of image to the coating layer, the content of polymer is preferably equal to or greater than 0.1% by weight, and is more preferably equal to or greater than 0.5% by weight, with respect to the weight of the water-based ink. On the other hand, from a view point of the storage stability of the water-based ink and discharging properties at the time of performing image-recording through the ink jet method, the content of polymer is preferably equal to or less than 10% by weight, and is more preferably equal to or less than 7% by weight with respect to the weight of the water-based ink.

Water

From a viewpoint of preventing the contamination of impurities or microbial occurrence, distilled water, ion exchange water, and ultrafiltered water are preferably used as water. A content of water is preferably in a range of 30% by weight to 80% by weight, and is more preferably in a range of 35% by weight to 70% by weight, with respect to the weight of the water-based ink.

Other Additives

The water-based ink in the exemplary embodiment may contain other additives if necessary. Examples of other additives include known additives such as a water-soluble organic solvent, a penetrating agent, a viscosity adjusting agent, a pH adjusting agent, a pH buffering agent, an antioxidant, an ultraviolet absorber, an infrared absorber, a preservative, an antifungal agent, and a surfactant.

Examples of the water-soluble organic solvent include alcohol, polyol, a polyol derivative, a nitrogen-containing solvent, and a sulfur-containing solvent. The water-soluble organic solvent may be used alone or in combination of two or more kinds thereof. A content of the water-soluble organic solvent is preferably in a range of 1% by weight to 40% by weight, and is more preferably in a range of 3% by weight to 30% by weight, with respect to weight of the water-based ink.

Physical Properties of Water-Based Ink

The viscosity the water-based ink is preferably in a range of 1 mPa·s to 50 mPa·s, is more preferably in a range of 1.2 mPa·s to 40 mPa·s, and is still more preferably in a range of 1.5 mPa·s to 30 mPa·s.

The surface tension of the water-based ink is preferably in a range of 20 mN/m to 40 mN/m, is more preferably in a range of 20 mN/m to 35 mN/m, and is still more preferably in a range of 25 mN/m to 35 mN/m.

The water-based ink described as above may be provided in a form of an ink cartridge which is detachable from the ink jet type image recording apparatus.

The water-based ink is not particularly limited to the ink jet method of discharging ink from the ink jet head. The ink jet method may be any one of known methods such as a piezo method of using vibration pressure of a piezo element; a charge control method of discharging ink by using an electrostatic attraction force; an acoustic ink jet method which is performed in such a manner that an electrical signal is converted into an acoustic beam, the ink is irradiated with the acoustic beam, and the ink is discharged by using the radiation pressure; and a thermal ink jet method of forming bubbles by heating the ink and using the generated pressure.

According to the water-based ink described above and the coating liquid of the exemplary embodiment, an image recording set, that is, an image recording set containing the coating liquid of the exemplary embodiment, and the water-based ink containing the coloring material and water is provided.

In addition, according to the water-based ink described above and the coating liquid of the exemplary embodiment, an image recording cartridge set, that is, an image recording cartridge set including a coating liquid cartridge which accommodates the coating liquid of the exemplary embodiment, and an ink cartridge which accommodates the water-based ink containing coloring material and water is provided.

An image-recording method by using the image recording set and the image recording cartridge set is not particularly limited; however, an ink jet method of discharging the water-based ink from the ink jet head is preferably used.

EXAMPLE

Hereinafter, the exemplary embodiment will be specifically described with reference to Examples; however, the exemplary embodiment is not limited to Examples. In the following description, unless otherwise noted, "%" is based on weight.

Example 1

Preparation of Coating Liquid 1

Aqueous dispersion of polypropylene particles (solid content 30%): 33%

Calcium nitrate: 3%

Polyoxyethylene styrenated-phenyl ether (HLB value 18.0): 1%

OLFINE E1004 (manufactured by Nissin Chemical Industry Co., Ltd., HLB value 7 to 9): 0.5%

1,2-Hexane diol: 0.05%

Pure water (JIS K0557, Type A3, the same in the following examples): 62.45%

The above-described materials are mixed according to the above composition, and then are filtrated with a filter (pore size: 5 μm) so as to obtain a coating liquid 1.

Preparation of Water-Based Ink K1

Carbon black: 5.0%

Styrene-acrylic acid Na-acrylic acid alkyl ester copolymer: 2.0%

Glycerin: 15.0%

2-pyrrolidone: 5.0%

1,2-Hexane diol: 3.0%

OLFINEE1010 (manufactured by Nissin Chemical Industry Co., Ltd.): 1.5%

Pure water: 68.5%

The above-described materials are mixed according to the above composition, and then are filtrated with a filter (pore size: 5 μm) so as to obtain a black water-based ink K1.

Preparation of Water-Based Ink C1

Cyan water-based ink C1 is prepared in the same manner as in the preparation of the water-based ink K1 except that 5.0% of carbon black is changed to 4.5% of C.I. Pigment Blue 15:4.

Preparation of Water-Based Ink M1

Magenta water-based ink M1 is prepared in the same manner as in the preparation of the water-based ink K1 except that 5.0% of carbon black is changed to 6.0% of C.I. Pigment Red 122.

Preparation of Water-Based Ink Y1

Yellow water-based ink Y1 is prepared in the same manner as in the preparation of the water-based ink K1 except that 5.0% of carbon black is changed to 5.0% of C.I. Pigment Yellow 74.

Image Recording

An ink-jet recording system which is provided with a gravure coater for coating the coating liquid, a first infrared heater, a piezo-type ink-jet head having 1200 dpi (dot per inch) of resolution, and a second infrared heater is prepared, and is charged with the coating liquid 1 and four colors of the water-based ink (K1, C1, M1, and Y1). As a non-permeable base material, a polypropylene stretched film of which the surface is subjected to the corona discharge treatment is prepared.

The entire surface of one side of the polypropylene stretched film is coated with the coating liquid 1 such that the content of the aggregating agent for a coloring material in the coating layer becomes 0.12 g/m$^2$, and then is dried by using a first infrared heater (at a heating temperature of 60° C.), thereby forming a coating layer. Next, the water-based ink is discharged from the ink jet head (discharging order of K1, C1, M1, and Y1) on the coating layer, and then dried by using a second infrared heater, thereby obtaining a recording image onto the coating layer. As the recording image, a 2 dot-line image (line image) for each color, and an image obtained by surrounding the black line image by a yellow solid image (image having 100% of concentration) are recorded.

Evaluation

Regarding the coating liquid 1, the coating layer, and the recording image, the following evaluation is performed.

Storage Stability

The coating liquid is stored in a thermostatic bath at 23° C. and 60° C. for 2 months, and classified as follows.

G1: after storing at 23° C. and 60° C. for 2 months, appearance and physical properties (pH and viscosity) are almost not changed.

G2: after storing at 23° C. for 2 months, appearance and physical properties are almost not changed, and after storing at 60° C. for 2 months, thickening or polymer aggregation occurs.

NG: thickening and polymer aggregation occur within a week, at 23° C. and 60° C.

Cloudiness of Coating Layer

After image recording, the coating layer of a non-imaging portion is visually observed, and classified.

G1: the coating layer is transparent.

G2: the coating layer is slightly cloudy, and a text image is readable over film similarly to the case of an uncoated state.

NG: the coating layer is cloudy, and a text image is not readable over film.

Bleeding Between Colors

Regarding an image obtained by surrounding the black line image by a yellow solid image, the black line image is visually observed, and classified as follows.

G1: bleeding does not occur.

G2: bleeding slightly occurs.

NG: bleeding occurs, the black line image has no linearity.

Fixing Properties of Image

An adhesive tape is adhered on the recording image, a peeling test to peel the adhesive tape is performed, and the fixing properties of the image are classified as follows.

G0: image peeling does not occur even with a strong adhesive tape.

G1: image peeling does not occur.

G2: image peeling slightly occurs.

NG: the entire image under the adhesive tape is peeled off.

Comparative Example 1

Preparation of Comparative Coating Liquid 1

The comparative coating liquid 1 is prepared in the same manner as in the preparation of Example 1 except that calcium nitrate and polyoxyethylene styrenated-phenyl ether (HLB value 18.0) are not contained and the pure water is contained instead. In the same manner as in Example 1, the evaluation for the comparative coating liquid 1, the coating layer, and the recording image is performed.

Comparative Example 2

Preparation of Comparative Coating Liquid 2

The comparative coating liquid 2 is prepared in the same manner as in the preparation of Example 1 except that aqueous dispersion of polypropylene particles and polyoxyethylene styrenated-phenyl ether (HLB value 18.0) are not contained and the pure water is contained instead. In the same manner as in Example 1, the evaluation for the comparative coating liquid 2, the coating layer, and the recording image is performed.

Comparative Example 3

Preparation of Comparative Coating Liquid 3

Although preparation of the coating liquid is performed by using the same manner as in the preparation of Example 1 except that polyoxyethylene styrenated-phenyl ether (HLB value 18.0) is not contained and the pure water is contained instead, but the polymers are aggregated and gelled, and thereby the comparative coating liquid 3 is not obtained.

Comparative Example 4

Preparation of Comparative Coating Liquid 4

Although preparation of the coating liquid is performed by using the same manner as in the preparation of Example 1 except that polyoxyethylene styrenated-phenyl ether (HLB value 18.0) is changed to polyoxyethylene alkyl phenyl ether (HLB value 12.5), but the polymers are aggregated, and thereby the comparative coating liquid 4 is not obtained.

Comparative Example 5

Preparation of Comparative Coating Liquid 5

The comparative coating liquid 5 is prepared in the same manner as in the preparation of Example 1 except that polyoxyethylene styrenated-phenyl ether (HLB value 18.0) is changed to polyoxyethylene alkyl phenyl ether (HLB value 14.2). In the same manner as in Example 1, the evaluation for the comparative coating liquid 5, the coating layer, and the recording image is performed.

Example 2

Preparation of Coating Liquid 2

Aqueous dispersion of polypropylene particle (solid content 25%): 40%

Calcium nitrate: 2%

Polyoxyethylene styrenated-phenyl ether (HLB value 15.6): 0.75%

OLFINEE1010 (manufactured by Nissin Chemical Industry Co., Ltd., HLB value 13 to 14): 0.3%

1,2-Hexane diol: 0.05%

Pure water: 56.9%

The above-described materials are mixed according to the above composition, and then are filtrated with a filter (pore size: 5 μm) so as to obtain a coating liquid 2. In the same manner as in Example 1, the evaluation for the coating liquid 2, the coating layer, and the recording image is performed.

Example 3

Preparation of Coating Liquid 3

Aqueous dispersion of polypropylene particle (solid content 40%): 25%

Calcium nitrate: 3%

Polyoxyethylene alkyl ether (HLB value 18.9): 1%

OLFINE E1004 (manufactured by Nissin Chemical Industry Co., Ltd., HLB value 7 to 9): 0.2%

1,2-Hexane diol: 0.05%

Pure water: 70.75%

The above-described materials are mixed according to the above composition, and then are filtrated with a filter (pore size: 5 μm so as to obtain a coating liquid 3. In the same manner as in Example 1, the evaluation for the coating liquid 3, the coating layer, and the recording image is performed.

Example 4

Preparation of Coating Liquid 4

Aqueous dispersion of polypropylene particle (solid content 30%): 33%

Magnesium nitrate: 3%

Polyoxyethylene alkyl ether (HLB value 17.5):

OLFINE E1004 (manufactured by Nissin Chemical Industry Co., Ltd., HLB value 7 to 9): 0.4%

1,2-Hexane diol: 0.05%

Pure water: 62.55%

The above-described materials are mixed according to the above composition, and then are filtrated with a filter (pore size: 5 μm so as to obtain a coating liquid 4. In the same manner as in Example 1, the evaluation for the coating liquid 4, the coating layer, and the recording image is performed.

Example 5

Preparation of Coating Liquid 5

Aqueous dispersion of polypropylene particle (solid content 40%): 25%

Calcium nitrate: 3%

Polyoxyethylene alkyl ether (HLB value 18.4): 1%

OLFINE E1004 (manufactured by Nissin Chemical Industry Co., Ltd., HLB value 7 to 9): 0.4%

1,2-Hexane diol: 0.05%

Pure water: 70.55%

The above-described materials are mixed according to the above composition, and then are filtrated with a filter (pore size: 5 μm so as to obtain a coating liquid 5. In the same manner as in Example 1, the evaluation for the coating liquid 5, the coating layer, and the recording image is performed.

Example 6

Preparation of Coating Liquid 6

Aqueous dispersion of polypropylene particle (solid content 25%): 40%

Magnesium nitrate: 2%

Polyethylene glycol alkyl ester (HLB value 19.4): 1%

SURFYNOL 104 (manufactured by Nissin Chemical Industry Co., Ltd., HLB value 4): 0.1%

1,2-Hexane diol: 0.05%

Pure water: 56.85%

The above-described materials are mixed according to the above composition, and then are filtrated with a filter (pore size: 5 μm) so as to obtain a coating liquid 6. In the same manner as in Example 1, the evaluation for the coating liquid 6, the coating layer, and the recording image is performed.

Comparative Example 6

Preparation of Comparative Coating Liquid 6

Aqueous dispersion of polypropylene particle (solid content 35%): 28.57%

Calcium nitrate: 3%

Polyoxyethylene alkyl ether (HLB value 15.3):

OLFINE E1010 (manufactured by Nissin Chemical Industry Co., Ltd., HLB value 13 to 14): 1%

1,2-Hexane diol: 0.05%

Pure water: 66.38%

The above-described materials are mixed according to the above composition, and then are filtrated with a filter (pore size: 5 μm) so as to obtain a comparative coating liquid 6. In the same manner as in Example 1, the evaluation for the comparative coating liquid 6, the coating layer, and the recording image is performed.

Example 7

Preparation of Coating Liquid 7

Aqueous dispersion of polypropylene particle (solid content 40%): 25%

Magnesium nitrate: 3%

Polyoxyethylene alkyl ether (HLB value 15.8): 2.5%

OLFINE E1004 (manufactured by Nissin Chemical Industry Co., Ltd., HLB value 7 to 9): 0.1%

Pure water: 69.4%

The above-described materials are mixed according to the above composition, and then are filtrated with a filter (pore size: 5 μm) so as to obtain a coating liquid 7. In the same manner as in Example 1, the evaluation for the coating liquid 7, the coating layer, and the recording image is performed.

Example 8

Preparation of Coating Liquid 8

Aqueous dispersion of polypropylene particle (solid content 32%): 31.25%

Calcium nitrate: 2%

Polyoxyethylene styrenated-phenyl ether (HLB value 18.0): 0.5%

SURFYNOL 440 (manufactured by Nissin Chemical Industry Co., Ltd., HLB value 8): 0.2%

Pure water: 66.05%

The above-described materials are mixed according to the above composition, and then are filtrated with a filter (pore size: 5 W so as to obtain a coating liquid 8. In the same manner as in Example 1, the evaluation for the coating liquid 8, the coating layer, and the recording image is performed.

Example 9

Preparation of Coating Liquid 9

Aqueous dispersion of polypropylene particle (solid content 20%): 50%

Calcium nitrate: 0.3%

Polyoxyethylene styrenated-phenyl ether (HLB value 15.6): 0.5%

SURFYNOL 465 (manufactured by Nissin Chemical Industry Co., Ltd., HLB value 13): 0.5%

PROXEL GXL (Lonza Japan Ltd., Preservative): 0.005%

Pure water: 48.695%

The above-described materials are mixed according to the above composition, and then are filtrated with a filter (pore size: 5 μm) so as to obtain a coating liquid 9. In the same manner as in Example 1, the evaluation for the coating liquid 9, the coating layer, and the recording image is performed.

Example 10

Preparation of Coating Liquid 10

Aqueous dispersion of polypropylene particle (solid content 40%): 12.5%

Calcium nitrate: 3%

Polyoxyethylene alkyl ether (HLB value 16.5): 1.5%

OLFINE E1004 (manufactured by Nissin Chemical Industry Co., Ltd., HLB value 7 to 9): 0.3%

PROXEL GXL (Lonza Japan Ltd., Preservative): 0.005%

Pure water: 82.695%

The above-described materials are mixed according to the above composition, and then are filtrated with a filter (pore size: 5 μm) so as to obtain a coating liquid 10. In the same manner as in Example 1, the evaluation for the coating liquid 10, the coating layer, and the recording image is performed.

Example 11

Preparation of Coating Liquid 11

Aqueous dispersion of polypropylene particle (solid content 40%): 50%

Calcium nitrate: 2%

Polyoxyethylene distyrenated-phenyl ether (HLB value 16.8): 1%

SURFYNOL 465 (manufactured by Nissin Chemical Industry Co., Ltd., HLB value 13): 0.5%

1,2-hexane diol: 0.1%

Pure water: 46.4%

The above-described materials are mixed according to the above composition, and then are filtrated with a filter (fpore size: 5 μm) so as to obtain a coating liquid 11. In the same manner as in Example 1, the evaluation for the coating liquid 11, the coating layer, and the recording image is performed.

Example 12

Preparation of Coating Liquid 12

Aqueous dispersion of polypropylene particle (solid content 40%): 25%

Magnesium nitrate: 5%
Polyoxyethylene alkyl ether (HLB value 15.6): 2%
OLFINE E1010 (manufactured by Nissin Chemical Industry Co., Ltd., HLB value 13 to 14): 1%
PROXEL GXL (Lonza Japan Ltd., Preservative): 0.005%
Pure water: 66.995%

The above-described materials are mixed according to the above composition, and then are filtrated with a filter (pore size: 5 μm) so as to obtain a coating liquid 12. In the same manner as in Example 1, the evaluation for the coating liquid 12, the coating layer, and the recording image is performed.

Example 13

Preparation of Coating Liquid 13
Aqueous dispersion of polypropylene particle (solid content 30%): 33%
2-Pyrrolidone-5-carboxylic acid: 7%
Lithium hydroxide: 0.8%
Polyoxyethylene styrenated-phenyl ether (HLB value 18.0): 2%
OLFINE E1004 (manufactured by Nissin Chemical Industry Co., Ltd., HLB value 7 to 9): 0.5%
1,2-Hexane diol: 0.05%
Pure water: 56.65%

The above-described materials are mixed according to the above composition, and then are filtrated with a filter (pore size: 5 μm) so as to obtain a coating liquid 13. In the same manner as in Example 1, the evaluation for the coating liquid 13, the coating layer, and the recording image is performed.

Comparative Example 7

Preparation of Comparative Coating Liquid 7
Although preparation of the coating liquid is performed by using the same manner as in the preparation of Example 13 except that polyoxyethylene styrenated-phenyl ether (HLB value 18.0) is not contained and the pure water is contained instead, but the polymers are aggregated and gelled, and thereby the comparative coating liquid 7 is not obtained.

Comparative Example 8

Preparation of Comparative Coating Liquid 8
A comparative coating liquid 8 is prepared in the same manner as in the preparation of Example 13 except that polyoxyethylene styrenated-phenyl ether (HLB value 18.0) is changed to polyoxyethylene alkyl phenyl ether (HLB value 14.2). In the same manner as in Example 1, the evaluation for the comparative coating liquid 8, the coating layer, and the recording image is performed.

Evaluation results for Examples 1 to 13 and Comparative Examples 1, 2, 5, 6, and 8 are indicated in Table 1. In Table 1, "PP particle" represents a "polypropylene particle".

TABLE 1

| | Component of coating liquid | | | | | | | |
|---|---|---|---|---|---|---|---|---|
| | Polymer particle | | Aggregating agent for a coloring material | | First nonionic surfactant | | Second nonionic surfactant | |
| Example 1 | PP particle dispersant | 10% | Calcium nitrate | 3% | HLB value 18.0 | 1% | HLB value 7 to 9 | 0.5% |
| Comparative Example 1 | PP particle dispersant | 10% | — | | — | | HLB value 7 to 9 | 0.5% |
| Comparative Example 2 | — | | Calcium nitrate | 3% | — | | HLB value 7 to 9 | 0.5% |
| Comparative Example 3 | PP particle dispersant | 10% | Calcium nitrate | 3% | — | | HLB value 7 to 9 | 0.5% |
| Comparative Example 4 | PP particle dispersant | 10% | Calcium nitrate | 3% | HLB value 12.5 | 1% | HLB value 7 to 9 | 0.5% |
| Comparative Example 5 | PP particle dispersant | 10% | Calcium nitrate | 3% | HLB value 14.2 | 1% | HLB value 7 to 9 | 0.5% |
| Example 2 | PP particle dispersant | 10% | Calcium nitrate | 2% | HLB value 15.6 | 0.75% | HLB value 13 to 14 | 0.3% |
| Example 3 | PP particle dispersant | 10% | Calcium nitrate | 3% | HLB value 18.9 | 1% | HLB value 7 to 9 | 0.2% |
| Example 4 | PP particle dispersant | 10% | Magnesium nitrate | 3% | HLB value 17.5 | 1% | HLB value 7 to 9 | 0.4% |
| Example 5 | PP particle dispersant | 10% | Calcium nitrate | 3% | HLB value 18.4 | 1% | HLB value 7 to 9 | 0.4% |
| Example 6 | PP particle dispersant | 10% | Magnesium nitrate | 2% | HLB value 19.4 | 1% | HLB value 4 | 0.1% |
| Comparative Example 6 | PP particle dispersant | 10% | Calcium nitrate | 3% | HLB value 15.3 | 1% | HLB value 13 to 14 | 1% |
| Example 7 | PP particle dispersant | 10% | Magnesium nitrate | 3% | HLB value 15.8 | 2.5% | HLB value 7 to 9 | 0.1% |
| Example 8 | PP particle dispersant | 10% | Calcium nitrate | 2% | HLB value 18.0 | 0.5% | HLB value 8 | 0.2% |
| Example 9 | PP particle dispersant | 10% | Calcium nitrate | 0.3% | HLB value 15.6 | 0.5% | HLB value 13 | 0.5% |
| Example 10 | PP particle dispersant | 5% | Calcium nitrate | 3% | HLB value 16.5 | 1.5% | HLB value 7 to 9 | 0.3% |
| Example 11 | PP particle dispersant | 20% | Calcium nitrate | 2% | HLB value 16.8 | 1% | HLB value 13 | 0.5% |
| Example 12 | PP particle dispersant | 10% | Magnesium nitrate | 5% | HLB value 15.6 | 2% | HLB value 13 to 14 | 1% |
| Example 13 | PP particle dispersant | 10% | 2-pyrrolidone-5-carboxylic acid | 7% | HLB value 18.0 | 2% | HLB value 7 to 9 | 0.5% |
| Comparative Example 7 | PP particle dispersant | 10% | 2-pyrrolidone-5-carboxylic acid | 7% | — | | HLB value 7 to 9 | 0.5% |
| Comparative Example 8 | PP particle dispersant | 10% | 2-pyrrolidone-5-carboxylic acid | 7% | HLB value 14.2 | 2% | HLB value 7 to 9 | 0.5% |

TABLE 1-continued

|  | Physical properties of coating liquid | | Evaluation | | | |
|---|---|---|---|---|---|---|
|  | pH | Viscosity (mPa·s) | Storage stability | Cloudiness of coating layer | Bleeding between colors | Fixing properties of image |
| Example 1 | 9.2 | 1.95 | G1 | G1 | G1 | G1 |
| Comparative Example 1 | 9.5 | 1.66 | G1 | G2 | NG | G1 |
| Comparative Example 2 | 5.5 | 1.17 | G1 | G1 | G1 | NG |
| Comparative Example 3 | | | Coating liquid is not prepared | | | |
| Comparative Example 4 | | | Coating liquid is not prepared | | | |
| Comparative Example 5 | 9.2 | 2.10 | NG | NG | G1 | G1 |
| Example 2 | 9.3 | 1.78 | G2 | G2 | G1 | G1 |
| Example 3 | 9.0 | 1.85 | G1 | G1 | G1 | G1 |
| Example 4 | 8.6 | 2.10 | G1 | G1 | G1 | G1 |
| Example 5 | 8.3 | 1.68 | G1 | G1 | G1 | G1 |
| Example 6 | 9.2 | 2.35 | G2 | G1 | G1 | G1 |
| Comparative Example 6 | 8.8 | 2.07 | NG | G2 | G1 | G1 |
| Example 7 | 8.7 | 2.43 | G1 | G1 | G1 | G2 |
| Example 8 | 8.9 | 1.89 | G1 | G2 | G1 | G0 |
| Example 9 | 9.3 | 1.76 | G1 | G1 | G2 | G1 |
| Example 10 | 8.2 | 1.58 | G1 | G1 | G1 | G2 |
| Example 11 | 9.3 | 3.24 | G1 | G1 | G2 | G0 |
| Example 12 | 9.1 | 2.67 | G2 | G1 | G1 | G2 |
| Example 13 | 4.5 | 2.23 | G2 | G2 | G2 | G1 |
| Comparative Example 7 | | | Coating liquid is not prepared | | | |
| Comparative Example 8 | 4.4 | 2.36 | NG | NG | G2 | G1 |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A coating liquid comprising:
   a polymer particle;
   an aggregating agent for a coloring material;
   a first nonionic surfactant having an HLB value within the range of 15.5 to 20;
   a second nonionic surfactant with an HLB value of less than 15.5; and
   water,
   wherein a weighted average of the HLB value of the first nonionic surfactant and the second nonionic surfactant is 14.5 or greater.

2. The coating liquid according to claim 1,
   wherein the aggregating agent for a coloring material is at least one selected from the group consisting of an inorganic acid and an inorganic acid salt.

3. The coating liquid according to claim 1,
   wherein a content of the first nonionic surfactant is in a range of 10% by weight to 200% by weight, with respect to the weight of the aggregating agent for a coloring material.

4. The coating liquid according to claim 2,
   wherein a content of the first nonionic surfactant is in a range of 10% by weight to 200% by weight, with respect to the weight of the aggregating agent for a coloring material.

5. A recording medium comprising:
   a non-permeable base material; and
   a coating layer that is to be image-recorded with a water-based ink, and is formed on the non-permeable base material by using the coating liquid according to claim 1.

6. The recording medium according to claim 5,
   wherein the non-permeable base material is a resin film.

7. A recording medium comprising:
   a non-permeable base material; and
   a coating layer that is to be image-recorded with a water-based ink, is disposed on the non-permeable base material, and contains a polymer, an aggregating agent for a coloring material, a first nonionic surfactant having an HLB value within the range of 15.5 to 20, and a second nonionic surfactant with an HLB value of less than 15.5, wherein a weighted average of the HLB value of the first nonionic surfactant and the second nonionic surfactant is 14.5 or greater.

8. The recording medium according to claim 7,
   wherein the non-permeable base material is a resin film.

9. The coating liquid according to claim 1,
   wherein a content of the second nonionic surfactant is in a range of 0.05% by weight to 5% by weight with respect to the weight of the coating liquid.

* * * * *